United States Patent [19]

Bowen

[11] Patent Number: 5,785,439

[45] Date of Patent: *Jul. 28, 1998

[54] ENVIRONMENTALLY SAFE MACHINE CONTROL SECURITY SWITCH

[75] Inventor: James H. Bowen, Catharpin, Va.

[73] Assignee: Product Engineering & Manufacturing, Inc., Linden, Va.

[*] Notice: The term of this patent shall not extend beyond the expiration date of Pat. No. 5,577,848.

[21] Appl. No.: 858,919

[22] Filed: May 19, 1997

Related U.S. Application Data

[63] Continuation of Ser. No. 725,923, Oct. 4, 1996, Pat. No. 5,707,160, which is a continuation of Ser. No. 343,892, Nov. 17, 1994, Pat. No. 5,605,406, which is a continuation-in-part of Ser. No. 311,256, Sep. 23, 1994, Pat. No. 5,577,848, which is a continuation-in-part of Ser. No. 933,749, Aug. 24, 1992, abandoned.

[51] Int. Cl.$^6$ ........................................... B41J 5/00
[52] U.S. Cl. ............... 400/472; 340/825.31; 341/22; 345/168
[58] Field of Search ............... 400/472; 340/825.31; 341/22; 345/168, 170

[56] References Cited

U.S. PATENT DOCUMENTS

| | | | |
|---|---|---|---|
| 4,791,280 | 12/1988 | O'Connell et al. | 340/825.31 |
| 4,942,606 | 7/1990 | Kaiser et al. | 340/825.31 |
| 5,577,848 | 11/1996 | Bowen | 400/472 |
| 5,605,406 | 2/1997 | Bowen | 400/472 |

*Primary Examiner*—Edgar S. Burr
*Assistant Examiner*—Steven S. Kelley
*Attorney, Agent, or Firm*—Whitham, Curtis & Whitham

[57] ABSTRACT

A keyboard where no finger pressure is needed to input data, that uses rows of emitters opposed by rows of detectors to detect a finger position, that is environmentally sealed, and inherently intrinsic safe. The keyboard has a mouse function so an operators finger can be tracked to position a cursor on a host display, and input normal keyboard functions. A sleep mode for a display or keyboard that slows down the scan rate and emitter intensity to increase emitter life. A split keyboard for each hand with an arm rest with an arm strap to attach the keyboard to an operators arm and a strap to attach the keyboard to the arm of a chair. A learning keyboard with a mode for QWERTY or other key pattern keyboards that the position of the operators fingers are tracked and supper imposed on a display, so the operator can see when their finger is over the correct keyboard indicia so correct data entry can be made without looking at the keyboard.

11 Claims, 12 Drawing Sheets

20

ENVIRONMENTALLY SAFE MACHINE CONTROL SECURITY SWITCH

CROSS REFERENCE TO RELATED APPLICATION

This application is a continuation application of U.S. Ser. No. 08/725,923, filed Oct. 4, 1996, now U.S. Pat. No. 5,707,160, which itself was a continuation application of U.S. Ser. No. 08/343,892, filed Nov. 17, 1994, now U.S. Pat. No. 5,606,406, which itself was a continuation-in-part (CIP) application of U.S. Ser. No. 08/311,256, filed Sep. 23, 1994, now U.S. Pat. No. 5,577,848, which itself was a CIP application of U.S. Ser. No. 08/933,749 filed Aug. 24, 1992, now abandoned, and the complete contents of these aforementioned applications is herein incorporated by reference.

BACKGROUND OF THE INVENTION

1. Field of the Invention

The present invention generally relates to input devices for computers and other devices that need data entry by a person skilled in "Touch Typing" where speed of entry and being environmentally safe are the main concern.

2. Description of the Prior Art

There are no environmentally safe keyboards commercially available or prior art to date that can be used for Touch Typing or where speed of entry is addressed.

One type of keyboard that is environmentally safe and is accepted by the largest number of users is commercially available in the form of a keyboard with membrane switches. Membrane being one that has etched tracks on a printed circuit board (PCB) and over top of the tracks is a conductive membrane that is deflected by a persons finger to the extent it connects the tracks on the PCB giving a switch closure location to the host device. The main drawbacks of these devices are the pressure to make the contact is high and the life expectancy is only one to three million operations because the key domes break due to flexing. These keyboards come in a variety of key patterns, from standard looking typewriter to square matrix types, none of which are being used for Touch Typing.

The second type is made from standard individual switch type keyboards that are used for data entry to computers. In particular they put commercially available covers over the keyboard that only seal from the top, are unsightly to the professional and also restrict Touch Typing.

Disclosures and letters patents have disclosed various other methods of keyboards. None of which are commercially available. They use emitters and detectors for input coordinates for keys. All operate with a fixed grid of recesses for keys and emit the light beam through various types of lenses at each key location, to name two: IBM Technical Disclosure Bulletin, Vol. No. 4, September 1977, S75180086M and U.S. Pat. No. 4,387,367, Fisher. Both, as others, are not for Touch Typing because your finger must go into a hole in a fixed grid key location to block the light path. A person skilled in Touch Typing is only concerned about what they are looking at, the data that is being displayed on the display and not where they are putting their trained fingers. With a standard key switch type of keyboard it does not matter where you touch the key cap only that you touch the right one. The typist may put their finger in the exact same location each time they type a key, but the location could be anywhere on the key cap, and they are not expecting to hit a hole or individual recess. These types of keyboards are also not easily cleaned because of the plurality of key location recesses.

Other Letters Patents have been allowed for touch screen computer entry devices over CRT'S. They display various patterns on the CRT for persons wanting to interface with the device. Some of the patterns have been in a pattern similar to the standard typewriter, but the attitude of the CRT and the intended use is not for Touch Typing. The similar keyboard pattern that can be displayed on the CRT is only there so a person skilled in Touch Typing will know where to look to point their finger to input data. To emphasize this more, most of the key arrangements are a,b,c . . . z and not QWERTY.

One CRT device uses the detector to sense ambient light prior to detecting an object and adjusts the threshold of the sensing circuit. This is disclosed in. U.S. Pat. No. 4,243,879, Carroll et al. This disclosure does have short comings, two of which are, it lacks the ability to give a warning of an error or to adjust the output of the emitter if the ambient is of a high enough nature to be out of its preset difference between detection of an object and the ambient threshold. Obviously these disclosures are for detection means to be used over more vertical displays that are recessed to shield ambient light and would not successfully satisfy the more horizontal position of a Touch Typing keyboard. Also in the industrial areas where environmentally safe keyboards are used Underwriters Laboratories states that a CRT must withstand the energy of a five foot pound steel ball drop test and not explode into the operators environment. In practice this means a thick piece of polycarbonate over the CRT. Further emphasizing that CRT's are not used or intended for Touch Typing.

SUMMARY OF THE INVENTION

To date none of the prior art has addressed the problem of being able to be used for Touch Typing or speed of entry, it is therefore the object of this invention to provide an environmental sealed keyboard or mouse that can be used for speed typing, that is versatile enough to be made in different sizes for different speed typing needs, and by the light beam passing over a plurality of key locations in an unilocular area, that plurality of key locations can be easily wiped clean. Also by field changing a coded overlay with printed indicia to a different code, different scan techniques can be used to optimize the different key text patterns, multiple levels of access to the keyboard and a host can be accommodated for different persons, and different ambient levels can be set to optimize different applications. To incorporate a new and different scan technique for detecting an input. And have a longer life expectancy, and by not needing a switch contact closure be inherently intrinsic safe.

Briefly, this invention contemplates having two adjacent rows of emitters opposed by two adjacent rows of detectors for detecting the presence of a finger or other object, and for cost savings, have the ability to have less emitters than detectors. Also having ambient light sensitive detectors to be coded by a field changeable indicia so a scan pattern, ambient reference level or other application specific variables can be changed in the keyboard without breaking the environmental seal or powering down the keyboard. By using the divergent angle of the rays of the emitters and detectors so coded patterns can be scanned at ninety degrees or angles formed by the adjacent detectors for optimizing the different keyboard patterns. And scanning the finger position by the ninety degree detectors and another angle would give a second cross check of finger location or ambient change.

A further object of this invention is that in the different scan patterns they can include the scanning sequence, the amplitude of the emitter, by increasing or decreasing the turn-on pulses, can be optimized and the gain of the detector amplifier can be optimized, by changing the feedback. These optimizations are to adjust the keyboard to different ambient light conditions so errors can be detected by the emitter detector pair being scanned at the closest possible physical location to sensing a finger or other object.

A further object of this invention is in the different said scan patterns, they can include, a scan sequence whereby when the ambient light is sensed, and then an opposing emitter is turned on and is not detected by the detector, a check of the n+1 and the n−1 emitter detector pairs are checked, and if both detect their emitter then the finger is present.

A further object of this invention is to be able to use one feedback gain to sense ambient light and a different gain to detect a finger or other object with the same emitter detector pair.

A further object of this invention is to differentiate a finger that is coming into the emitter detector light path from a finger that is moving between different emitter detector light paths.

A further object of this invention is to have the emitter emit a frequency that can be decoded by a detector so the emitter can emit different frequencies to a plurality of detectors and each detector can decode and receive a different frequency.

A further object of this invention is to have a mouse that is stationary where the operators finger moves in a window or over a display area and the speed of the finger can set the accuracy of cursor movement.

A further object of this invention is to provide an arm rest to support the operators wrist, hand and forearm.

A further object of this invention is to have two separate keyboard sides to form a complete keyboard with the keys associated with data entry from a left hand in the left side and the keys associated with data entry from the right hand in the right side.

And a further object of the invention is to have a sleep program in which the emitters and detectors are scanned on a reduced duty cycle and intensity to increase the life of the emitters.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE PREFERRED EMBODIMENT OF THE INVENTION

Figure 1:
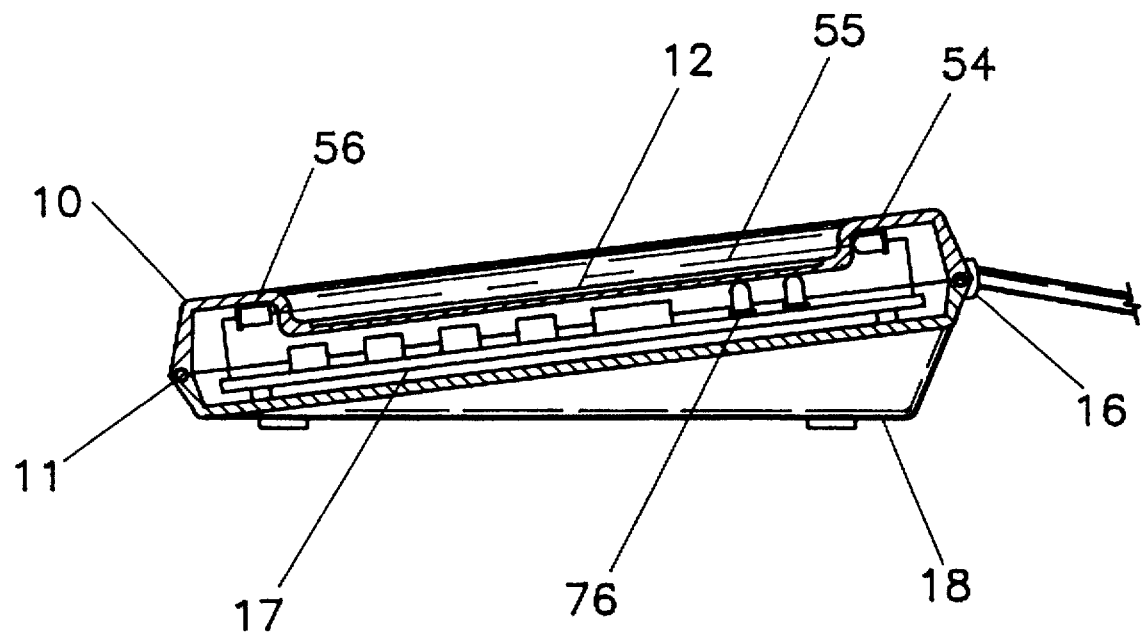
FIG. 1 is a cross section of the mechanical layout of the keyboard in accordance with the teachings of this invention.

Referring now to the drawings, in which the same reference numeral indicates the same element in the various figures, FIG. 1 shows a upper housing 10 that registers the indicia 12 over the detector 56, the emitter 54 and the scan pattern coding detectors 76. The indicia pattern can be printed on the upper housing 10. The detector 56 and the emitter 54 can be sensitive in the infrared spectrum of light and are used to sense the presence of a finger or other object that break light path 55. The detector 56 is also used to, on the fly, calibrate the keyboard to ambient light. The detectors 76 can also be sensitive in the infrared spectrum of light and through the binary system can give four different field changeable code patterns for scanning the keyboard, more detectors could obviously be used to increase the combinations. When the indicia pattern is printed on the upper housing 10 the code patterns can be fixed or changeable by using adhesive pads or other means of blocking the light.

The indicia 12 has the key pattern for a given application, it may be a square pattern for small accountant type Touch Typing applications, or a standard Touch Typing key pattern as in the "Qwerty" type for word processing or data entry. The indicia can have raised areas at the key location for the applications where tactile feedback is needed. Having the raised area only on the indicia allows different locations of the raised areas on different individual indices. Those skilled in the art could also vary these patterns in any number of configurations. The indicia 12 also has areas that are aligned with detectors 76. By putting an opaque material in these areas can code the scan pattern for a given key pattern.

The indicia 12 can be held in place by different mediums depending on the applications. There are various, types of adhesive systems, some are permanent, semipermanent and the Velcro like, any of these types could be used. The indicia 12 can also be of a thicker material and snapped or otherwise held in place.

PCB 17 is the etched circuit and secures the electronics in the keyboard.

Seals 11 and 16 are used between the top cover 10 and the bottom cover 18 to seal the periphery of the keyboard and a cable to the host, respectively, against egress of environmental contaminants. If the keyboard is transmitting by other means, such as FM, then the cable and cable seal are not needed. These arrangements of mechanics allow for a sealed keyboard.

Figure 1A:
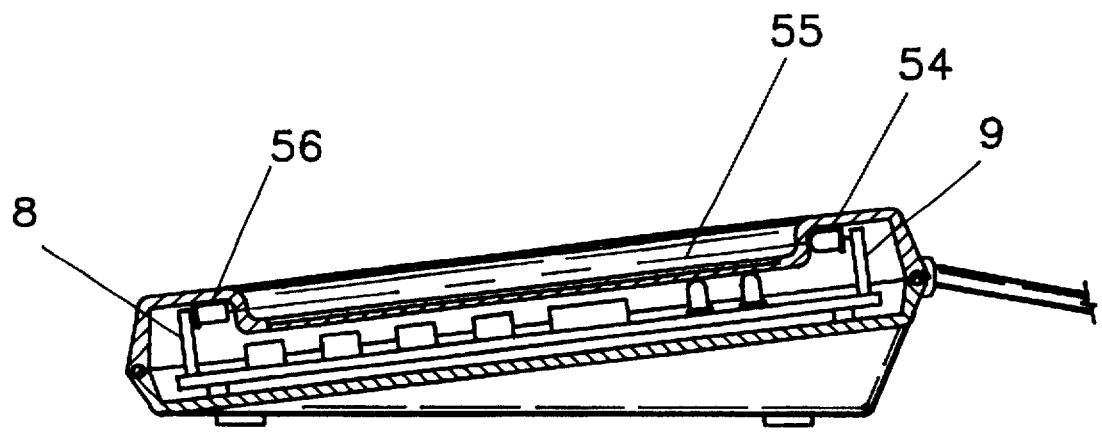
FIG. 1A is a cross section of the mechanical layout where the emitters and detectors are on a separate printed circuit board from the microprocessor in accordance with the teachings of this invention.

FIG. 1A shows that emitter 54 can be fixed to a separate printed circuit board 9 and detector 56 can be fixed to a separate printed circuit board 8. Printed circuit boards 8 and 9 are then plugged into PCB 17 to complete the circuit.

Figure 2:
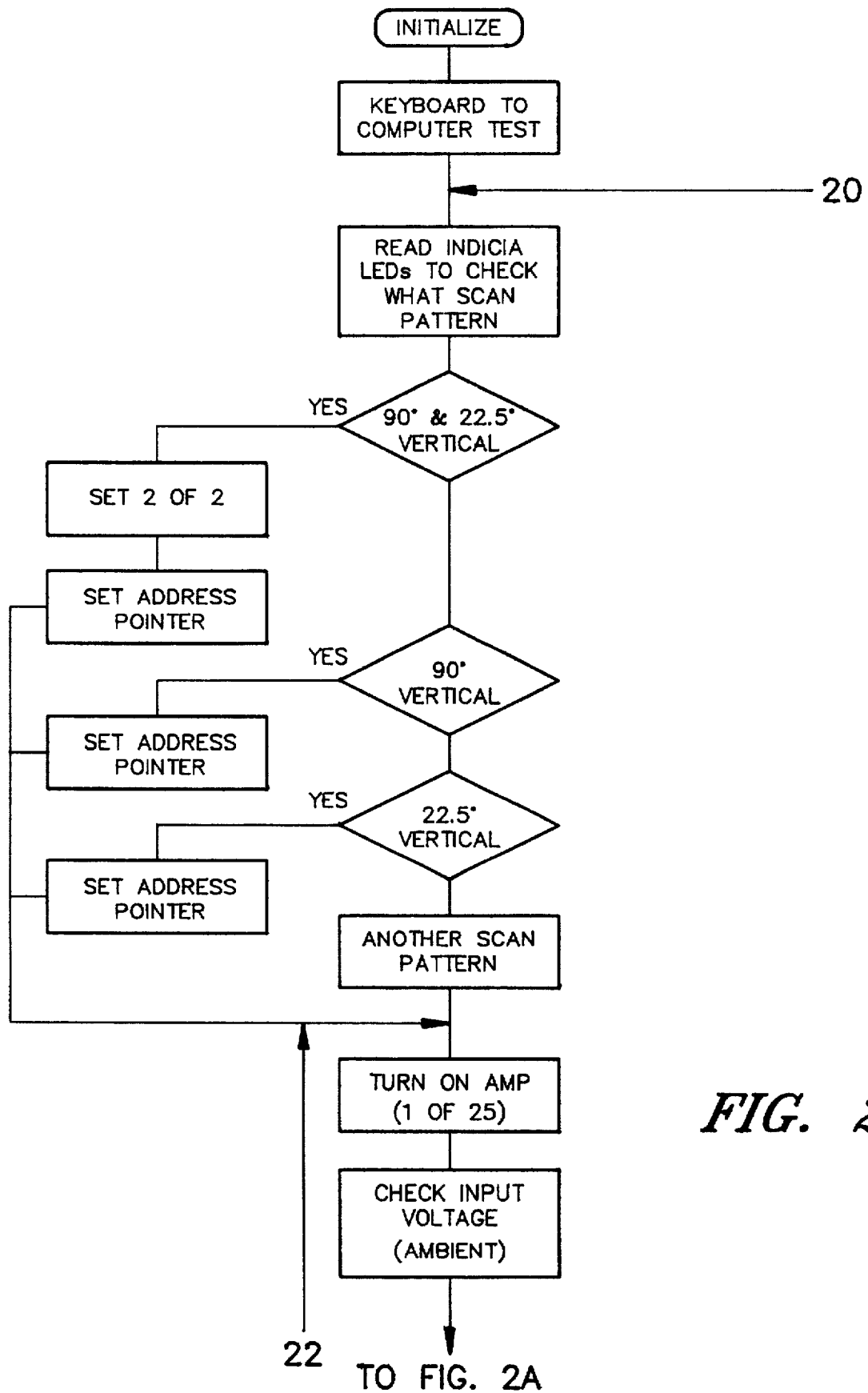
FIGS. 2, 2A, and 2B is a flow diagram illustrating the functions of the keyboard in accordance with the teachings of this invention.

FIG. 2 is a flow diagram of functions specific or particularly advantageous to the operation of this invention. The communication link, key roll overs and the ANSI letter codes for keyboards are application specific and would be set to the host requirements.

The INITIALIZE sets the different parameters for the keyboard on power up and any host application specific information for the host. KEYBOARD TO COMPUTER TEST is the hand shaking between the host and the keyboard and when data from the initial keyboard test is transmitted to the host. The sequence that starts the keyboard scan starts at READ INDICIA LEDs TO CHECK WHAT SCAN PATTERN. At this point the detectors 76 in FIG. 1 are checked for the pattern to be scanned. Having the check at this point allows for the indicia to be changed without powering down the keyboard. At 90 & 22.5 VERTICAL if the detectors 76 in FIG. 1 decode for this scan pattern a branch is made to SET 2 OF 2 where because two cross checks, but not limited to, at different angles will be made on certain locations this register must be set to be tested and decremented later in the flow diagram. SET ADDRESS OF POINTER gives the starting location for the sequence of scan. If detectors 76 of FIG. 1 are checked to be only one scan for a finger location then a branch is made at 90 VERTICAL or 22.5 VERTICAL depending on the application. At block ANOTHER SCAN PATTERN any number of different scan patterns for different applications can be programmed. Although only three different types are in detail, others skilled in the art could have an application requiring others like, cross checking each finger location with three or more different angled opposing emitters and detectors, or setting a different reference level for the ambient check, possibly to be used with keyboards that are being operated at different angles.

Figure 4:
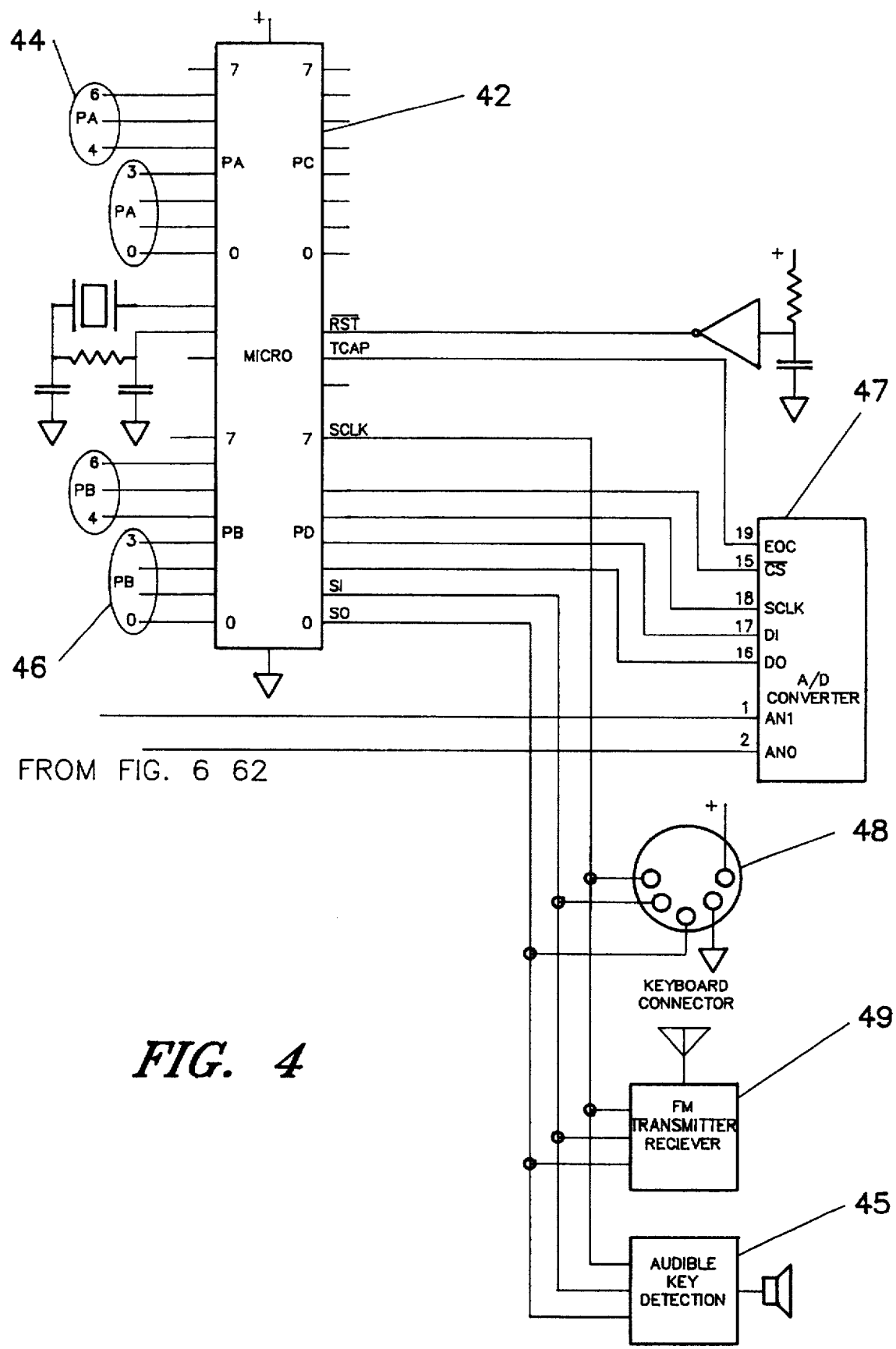
FIG. 4 is a schematic showing the microprocessor section of the invention in accordance with the teachings of this invention.
Figure 5:
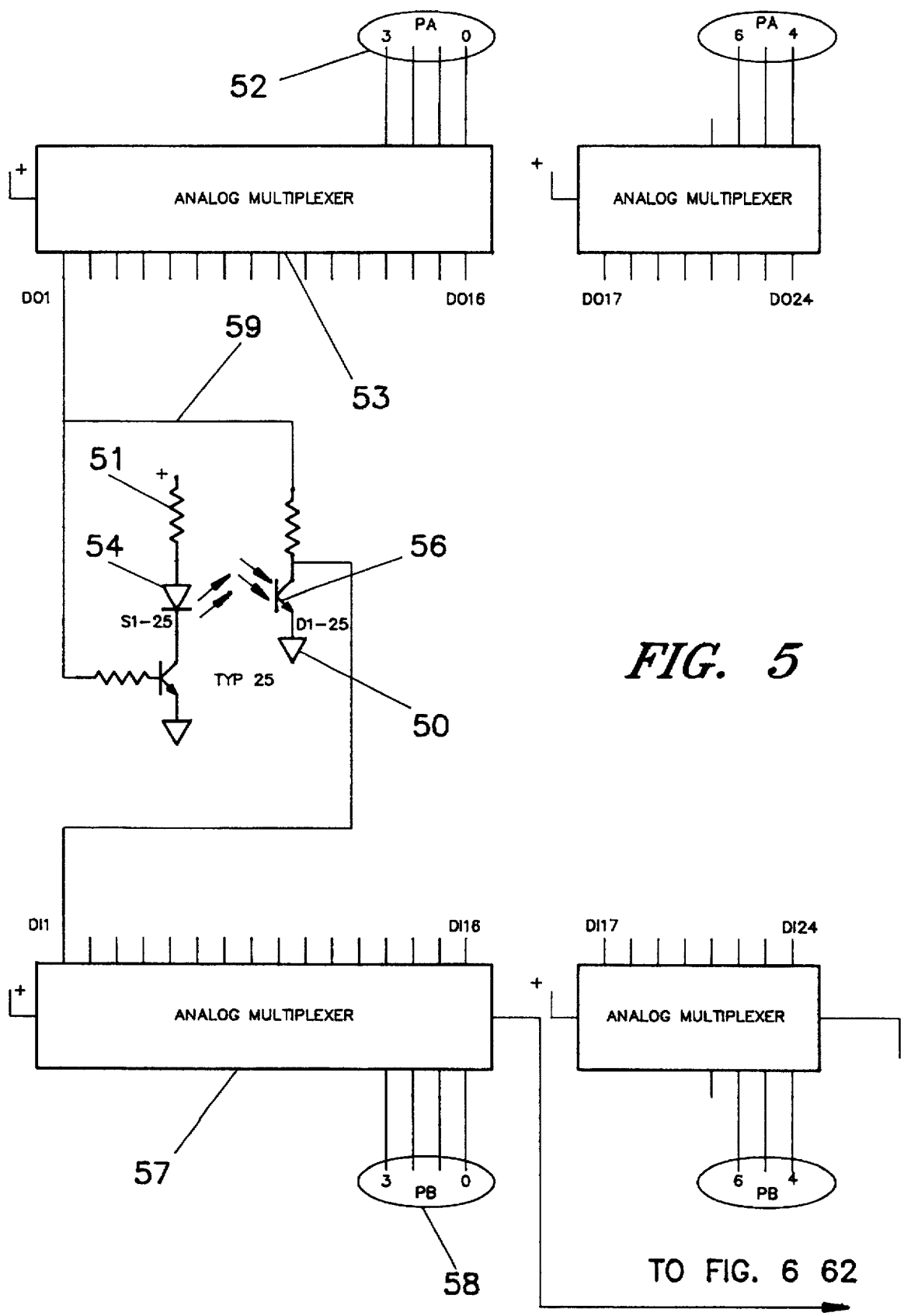
FIG. 5 is a schematic showing the elements that comprise the emitter and detector selectors of the keyboard in accordance with the teachings of this invention.
Figure 6:
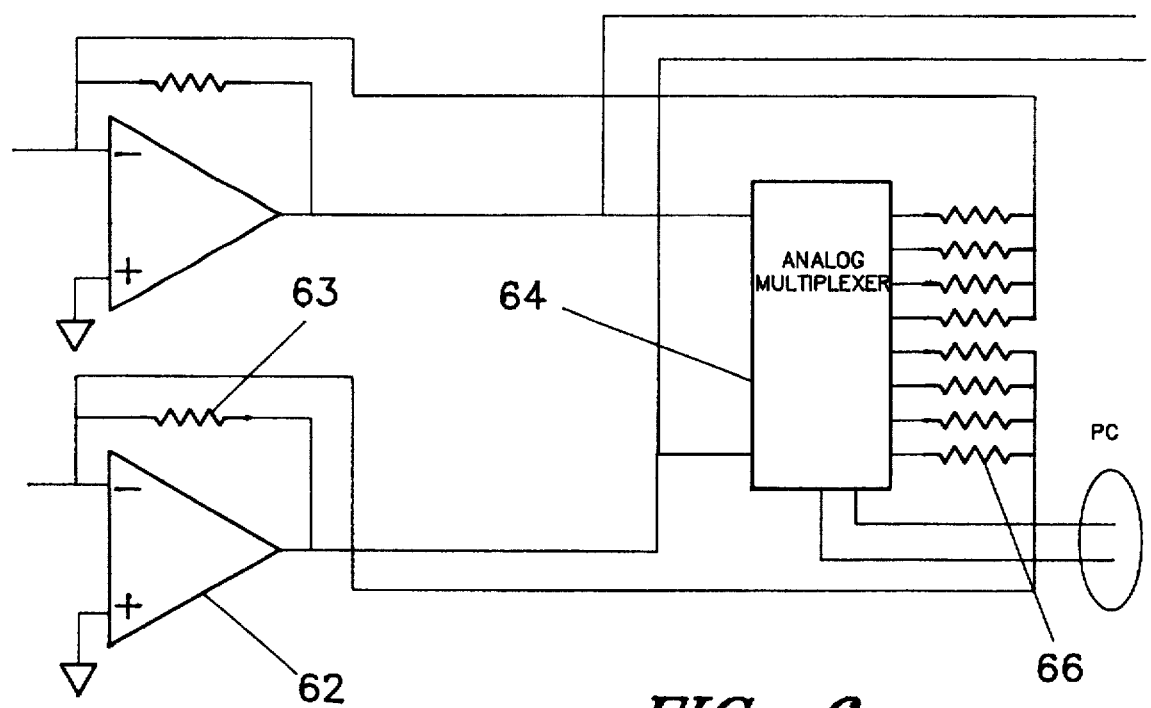
FIG. 6 is a schematic showing the detector amplifiers variable feedback gain control in accordance with the teachings of this invention.

At TURN ON AMP one of the twenty-five detectors 56 in FIG. 5 is addressed by the micro 42 in FIG. 4 through port at 46 to 58 of FIG. 5 and is connected through multiplexer 57 to amplifier 62 of FIG. 6. CHECK INPUT VOLTAGE takes the input analog voltage and converts that voltage to serial digital data at 47 of FIG. 4. This data is read by micro 42 where the data is tested. Since the opposing emitter 54 of FIG. 5 has not been turned on the voltage is an ambient light representation. Depending on the ambient condition, the ambient check can use a different value of feedback than is used to detect a finger. If after the ambient check a different value of feedback is needed that one of the feedback resistors 66 are paralleled over the fixed feedback resistor 63 by multiplexer 64 of FIG. 6.

Voltage limits are stored in the micro. At IS VOLTAGE IN LIMITS in FIG. 2A the input voltage is tested to those limits. If the voltage is not in limits it is checked to be high at VOLTAGE HIGH and if it is high a test is made at VALUE OF FEEDBACK AT HIGHEST to see if the present selected feedback resistor 66 of FIG. 6 is the highest, if not then the next higher value is selected by micro 42 FIG. 4 with the multiplexer 64 of FIG. 6 at INC FEEDBACK and then returned to IS VOLTAGE IN LIMITS for a retest. If at VOLTAGE HIGH the voltage is low then a test is made at VALUE OF FEEDBACK AT LOWEST to see if the present feedback resistor is the lowest, if not then the next lower value is selected by micro 42 FIG. 4 with the multiplexer 64 of FIG. 6 at DEC FEEDBACK and then returned to IS VOLTAGE IN LIMITS for a retest. If at VALUE OF THE FEEDBACK AT HIGHEST or VALUE OF THE FEEDBACK AT LOWEST the highest or the lowest feedback resistor has already been selected then they return to the positive decision of IS VOLTAGE IN LIMITS to turn on the emitter at TURN ON LED. At this point one of the twenty-five emitters 54 in FIG. 5 is addressed by the micro 42 in FIG. 4 through port 44 to 52 of FIG. 5 and is connected through multiplexer 53 to emitter 54.

The detector 56 of FIG. 5 is then tested to see if it is receiving the emitters on condition at DETECTOR VOLTAGE IN LIMITS. In this flow diagram only a vertical scan of the nineteen detectors are made, and if a finger has been detected then the horizontal scan is initiated. Those skilled in the art could obviously see that different applications might necessitate the need for scanning the horizontal detectors first or any number of other scan patterns.

By testing to see if the horizontal scan is completed means that a finger has been detected. If the detector voltage is in limits a test is made at HORZ SCAN COMPLETED, if it is completed then program returns to 20 of FIG. 2. If the decision is no the scan address is incremented at INC TO SCAN ADDRESS n+1 and the program returned to 22 of FIG. 2. If at FIG. 2A, DETECTOR VOLTAGE IN LIMITS the voltage is not in limits, meaning a finger has been detected or there is a faulty detector or emitter, then the program progresses to FIG. 2B. At DETECTOR n−1 IN LIMITS a test is made to check if the last detector emitter pair test in limits, if not then a branch is made to, DETECTOR n−2 IN LIMITS to see if it is in limits, if it is not in limits then a test is made to see if the voltage is high or low at DETECTOR VOLTAGE HIGH.

If the test at DETECTOR n−1 IN LIMITS or the test at DETECTOR n−2 IN LIMITS is yes then a test is made to see if the next detector emitter pair test in limits at DETECTOR n+1 IN LIMITS, if not then a branch is made to DETECTOR n+2 IN LIMITS to see if it is in limits, if it is not then a test is made to see if the voltage is high or low at DETECTOR VOLTAGE HIGH. The amplitude of the emitter is adjusted by a frequency of pulses that are used to turn it on. The detector 56 of FIG. 5 detects this amplitude or frequency as highs and lows. If at DETECTOR VOLTAGE HIGH the voltage is high then a test is made to see if the number of pulses are the least amount at PULSES AT LOWEST. The least amount of pulses are preprogrammed into the micro to match different applications as are the highest amount of pulses as will be explained later in this embodiment. If at DETECTOR VOLTAGE HIGH the voltage is low then a test is made to see if the number of pulses are at the highest amount at PULSES AT HIGHEST. If the pulses are at the lowest or the highest a branch is made to ERROR REGISTER AT HIGHEST to test if the correct number of failed tries have been made to flash an error message, if so the error message is initiated at FLASH ERROR MESSAGE and returned to 26 of FIG. 2A. If the correct number of failed tries have not been made then a branch is made to INC ERROR REGISTER where the error register is incremented by one and the program is returned to 24 of FIG. 2A.

Figure 2A:
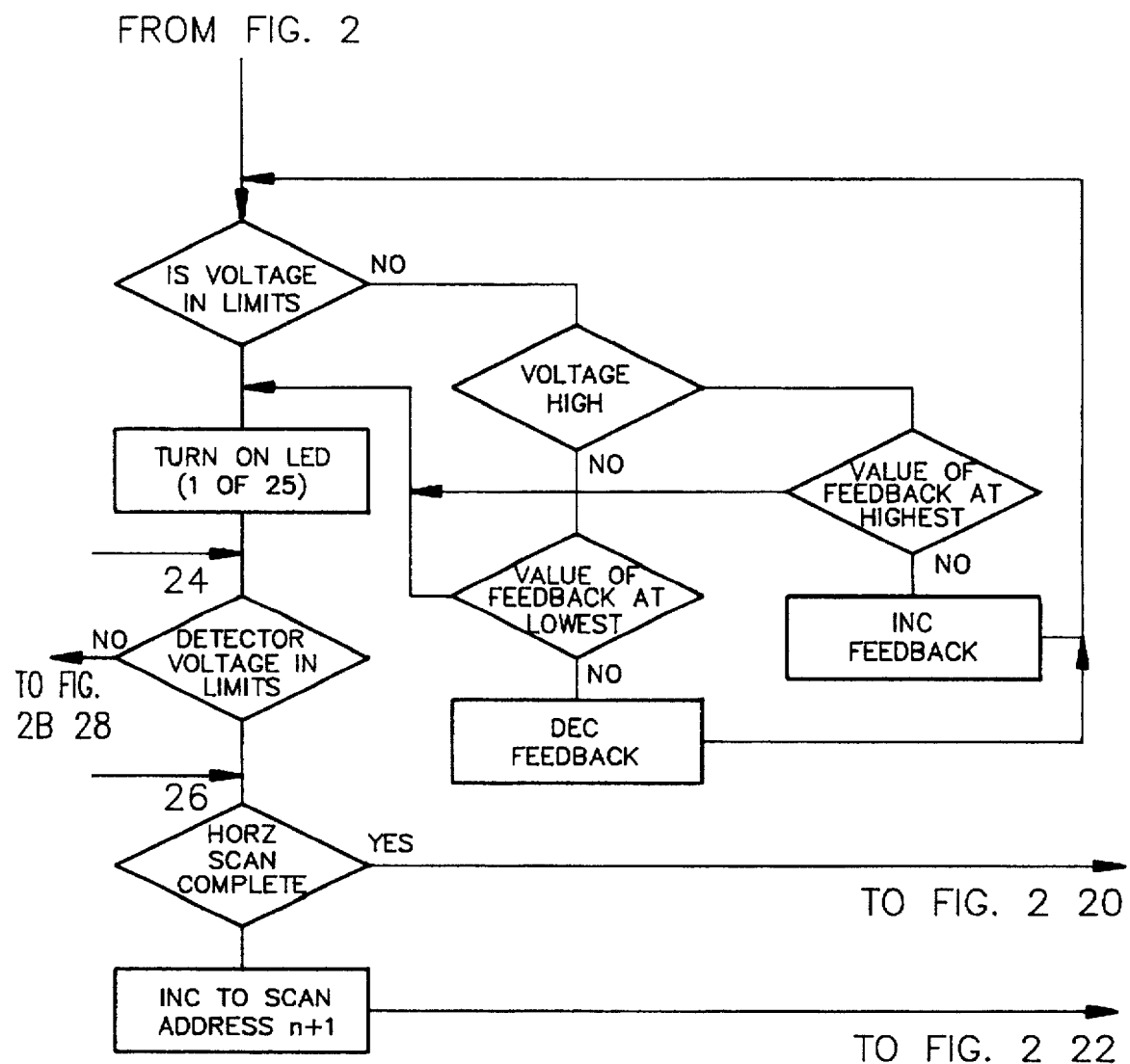
Figure 2B:
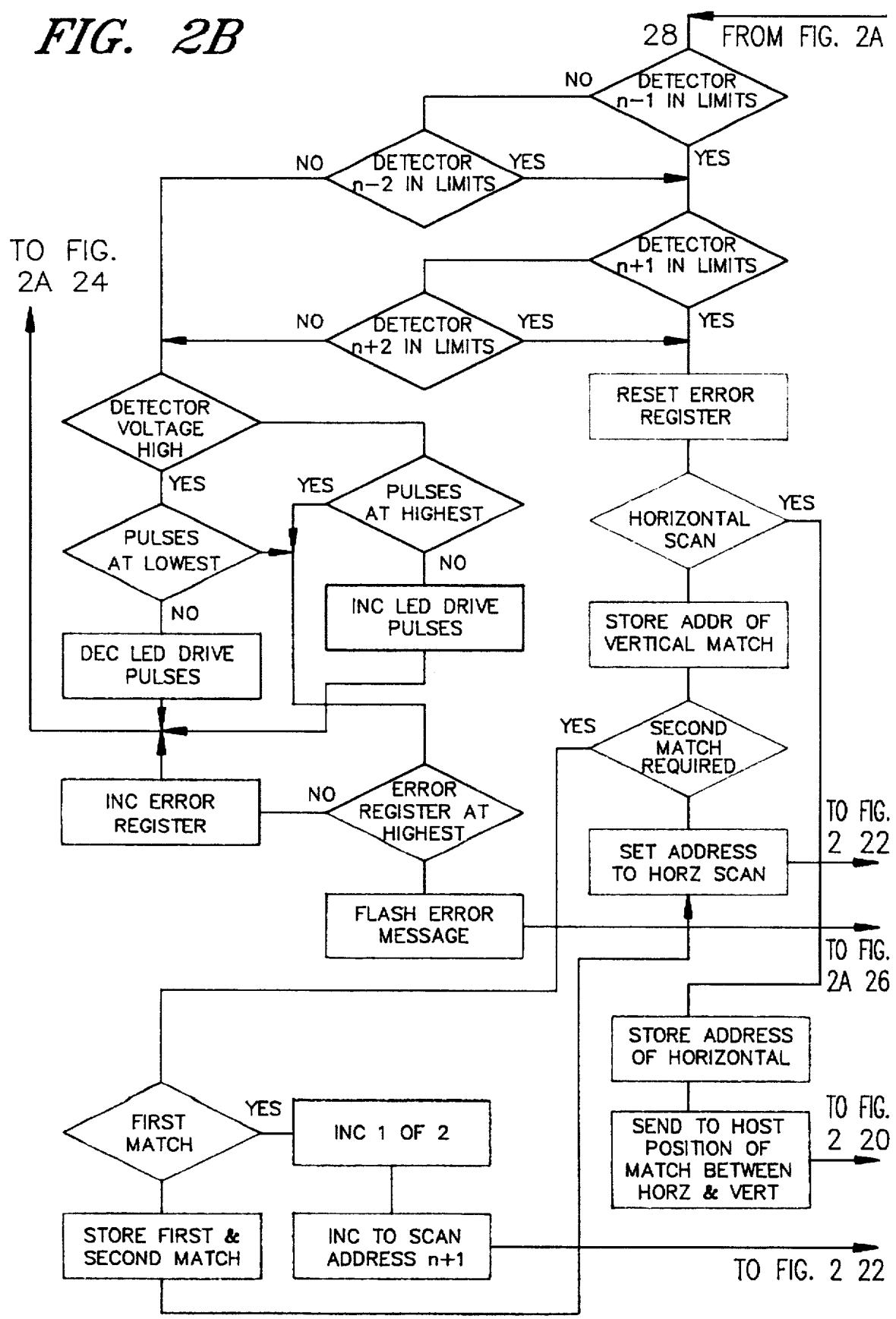

If at PULSES AT HIGHEST the pulses are not at the highest, then the next increment of preprogrammed pulses are loaded at INC LED DRIVE PULSES and the program is returned to 24 of FIG. 2A. If at PULSES AT LOWEST the pulses are not at, the lowest, then the next increment of preprogrammed pulses are loaded at DEC LED DRIVE PULSES and the program is returned to 24 of FIG. 2A.

This embodiment describes a method of scanning for a finger that if a finger is detected, both emitter detector pairs, before and after the detected finger position must show an on condition to be a valid key detection. Those skill in the art could obviously see that different applications could necessitate the need for scanning only to see if a finger was detected, and in certain applications where the need to check for ambient light is not necessary then this check could be omitted in the program.

If at DETECTOR n+1 IN LIMITS or DETECTOR n+2 IN LIMITS the decision is yes, meaning that emitter detector pairs on both sides of the detected finger location are in limits, then the keyboard has seen a finger so the program advances:to RESET ERROR REGISTER to clear any failed tries and moves to the decision HORIZONTAL SCAN. Since in this flow diagram the vertical scan is scanned first, if the finger position that has just been scanned is from the vertical scanning sequence, the horizontal scan must be checked to give the position of the finger. If the decision is no at HORIZONTAL SCAN then the address of the vertical detection is stored at STORE ADDR OF VERTICAL MATCH and then see if a different cross angle check is needed at SECOND MATCH REQUIRED. If a second match is required a branch is made to FIRST MATCH where a test is made to see if this is the first or second match. If it is the first match then a branch to INC 1 OF 2 is made to increment the register to slow the second match is now being checked. The next address to be scanned is loaded at INC TO SCAN ADDRESS n+1 and the program is returned to 22 of FIG. 2. If at FIRST MATCH it is the second match then the first and second matches are stored at STORE FIRST & SECOND MATCH. This also means that vertical scanning is completed, so the first horizontal address is loaded at SET ADDRESS TO HORZ SCAN. The program is then returned to 22 of FIG. 2. If at SECOND MATCH REQUIRED the second vertical match is not required the first horizontal address is loaded at SET ADDRESS TO HORZ SCAN. The program is then returned to 22 of FIG. 2. Now moving back to HORIZONTAL SCAN, if the match was made on the horizontal scan, then the address is stored at STORE ADDRESS OF HORIZONTAL and the matches between the single or multiple vertical and horizontal positions, depending on the host, could be sent to the host through connector 48 or FM transmitter/receiver 49 of FIG. 4 or maintained in the keyboard for later transmission back as ANSI characters or other data groups. The program is then returned back to 20 of FIG. 2.

The pulses that turn on the emitter are micro controlled and each pulse can be in the form of a burst of a frequency to be detected and decoded by the micro for a given detector. Having a frequency emitted and detected reduces interferences from ambient light and cross talk between emitters and detectors because only if the frequency is detected is the light path secure.

In FIG. 5 emitter 54 is current limited by resistor 51. A signal from analog multiplexer 53 turns on the transistor connected to ground illuminating emitter 54. The detector 56 is connected to ground 50 and is activated by being pulled high by connection 59 at the same time that emitter 54 is on. If a finger is present or is partially present will depend on the amount of turn-on or voltage amplitude of detector 56. In this configuration cross talk of the light paths between emitters and other detectors is eliminated. A second configuration of the connection of detector 56 is to connect the detector pull up resistor to the plus supply like emitter resistor 51. A third configuration of the connection of detector 56 is to connect the detector pull up resistor to a micro controlled signal. The different configurations give flexibility when using the detector to decode different emitted emitter frequencies.

To increase the life of the emitters whether the emitters surround a display, a keyboard or a keyboard with a display a sleep mode can be implemented wherein the emitters are scanned at a lower rate so as to only pick up the entry of a finger or stylus and not a particular location. The inactivity or sleep mode can also be started and stopped by a switch or other device out of or within the matrix of emitters and detectors. Once a detection of an object or switch is made then a normal scan rate is resumed and will remain for a given predetermined time that can be adjustable before, if no detections are detected, the scan rate is again reduced. This reduction can also be started from a switch. This lower scan rate can either be in amplitude or frequency. The lower scan rate can also be in the actual number of emitters being turned on. A pattern of every other emitter being turned on, every third emitter, or any number of other combinations all with the same end, to increase the life of the emitters can be used.

With the resultant outputs from detectors 56 in FIG. 5 connected to A/D converter 47 in FIG. 4 the amplitude of the signal can be analyzed. In the case where the keyboard is used for a mouse type of input where the finger is moved through the light path of different pairs of emitters and detectors instead of withdrawn at discrete locations to give a key text entry, the leaving of one light path and moving into another light path can be interpellated by micro 42 to give a smooth input to a host display to position a cursor. The direction of the finger can be determined by analyzing which detectors are blocked and which detector are partially blocked. If the finger is being inserted into the light beams, then the area or number of light beams that are starting to be blocked is increasing substantially equal from all sides, inversely if the area or number of light beams that are being blocked start to decrease substantially equal then the finger is being removed. Analyzing this data in micro 42 allows for either sending a data signal or click to the host computer at various times, or differentiating the removal or insertion of a finger from linear movement of the finger.

The speed that a finger is moving can also be determined by the rate of movement through the different light paths. This speed can be translated into cursor movement. If the finger moves slowly then the movement of the cursor is more accurate with less cursor increments of movement, and if the finger moves fast the movement of the cursor is fast with more cursor increments of movements resulting in the cursor moving a greater distance than the finger. This relation between the finger and the cursor lets the active area of the mouse be smaller and still give the cursor full display movement and positioning accuracy.

In FIG. 5 emitters 54 and detectors 56 are shown where they are paired. To reduce cost of the emitters, less emitters can be used, and the detecting of a finger is through triangulation. With one emitter that has a large angle divergent beam and a plurality of detectors, each detector can be scanned for detection of an object and which detector that is detecting the presents of the object allows the micro compute the angle. If there is emitters and detectors in an X Y pattern the micro 42 by knowing which detector is blocked in the X direction, the angle can be compared with the detection of the angle of detection of an object in the Y direction, the result is a discrete location of key text or moving finger. The pattern of less emitters than detectors can be replicated around the unilocular area, display area when used with a display, or other open area being scanned depending on the resolution needed by the keyboard.

The mouse area of finger movement is smaller than the display area of the host. The amount of movement of the cursor when the emitters and detectors are being scanned to track the finger position can be software adjusted to the operators preference. This preference can be a one to one relationship or be more or less. In the case where it is closer to one to one, when the operators finger is removed from the unilocular area, or other area, the last input position of the cursor is stored and will be retrieved for the starting point of the cursor when the finger is then inserted back into the unilocular area, or other area, so where the cursor starts to move from will be the same as where it stopped even if the location of the finger is different. This lets an operator move the cursor with their finger, lets say forward, and then withdraw their finger, insert their finger nearer the front and move their finger to the forward again, and continue moving the cursor on the display to a desired position. The action would be similar to, if you picked up a ball driven mouse on the rear side of a mouse pad and moved it to the front side and started to move the mouse to the rear again. By using the discrete text locations in the unilocular area, one could be pointed to for a one to one movement and another could be used for a ten to one movement, and still another for programs that need an accurate placement of the cursor could be one percent of actual finger movement.

Figure 3A:
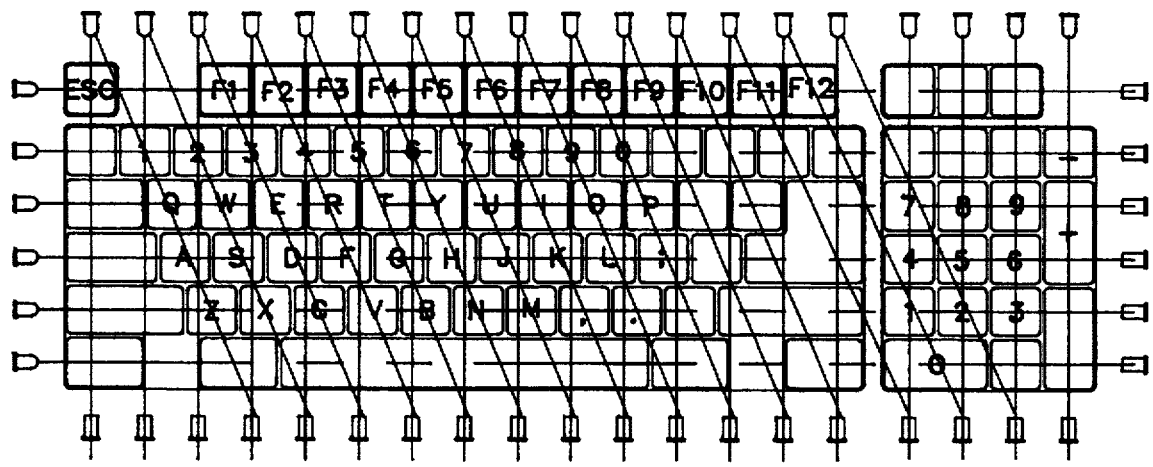
FIGS. 3A and 3B are diagrams of the various scan patterns of the keyboard in accordance with the teachings of this invention.
Figure 3B:
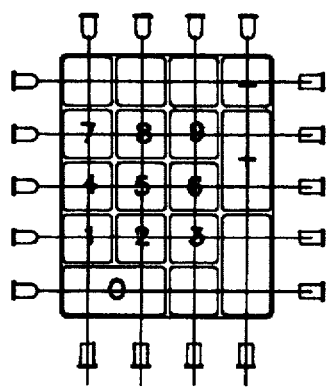

FIGS. 3A and 3B show two standard key patterns for Touch Typing keyboards. FIG. 3A shows that some of the keys are better scanned at about twenty-two degrees, some at ninety and some at angles between ninety and about twenty-two degrees. Having a keyboard invented for Touch Typing shows that less emitter detector pairs are needed, thus lower cost and better efficiency. It is to be understood that other types of emitter and detector packages could also be used.

Figure 9:
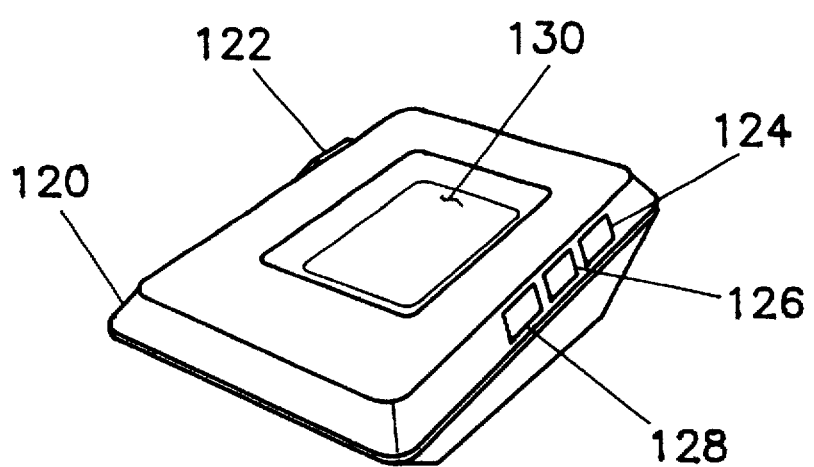
FIG. 9 shows a mouse with no indicia and switches in accordance with the teachings of this invention.

The indicia shown in FIGS. 3A and 3B are on a flat planar surface in an unilocular area. The mouse size of keyboard shown in FIG. 3B can have indicia, as shown, with full indicia, it can have indicia in a few discrete locations, or have no indicia as shown in FIG. 9. The keyboard pattern in FIG. 3A can have the mouse function also by recoding the scan pattern.

The keyboard in FIG. 3A could have more than one unilocular area where the number keypad and mouse function would be in one unilocular area and the QWERTY section of keys being in another unilocular area. If the keyboard is being used away from the host display and computer, a display could be on the keyboard. If the display is within the unilocular area then the display could be used for soft keys in which the key text could vary depending on the input function needed. With the display being on the keyboard the keyboard, with the addition of the other standard computer accessories, could be a full function computer or laptop computer.

The keyboard or mouse function in FIG. 3B can be placed on a standard keyboard with keys that depress to make data entry. The location would depend on the application. It could be between the QWERTY keys with the left and right hands being separating point so either hand could operate the keyboard or mouse function, or to a side either being the left, right, front and rear of the standard keyboard keys.

In FIG. 4 Audible Key Detection 45 is an option that can be used if the keyboard is not connected to a host or anytime that an audible sound is wanted when a key location is sensed.

Figure 7:
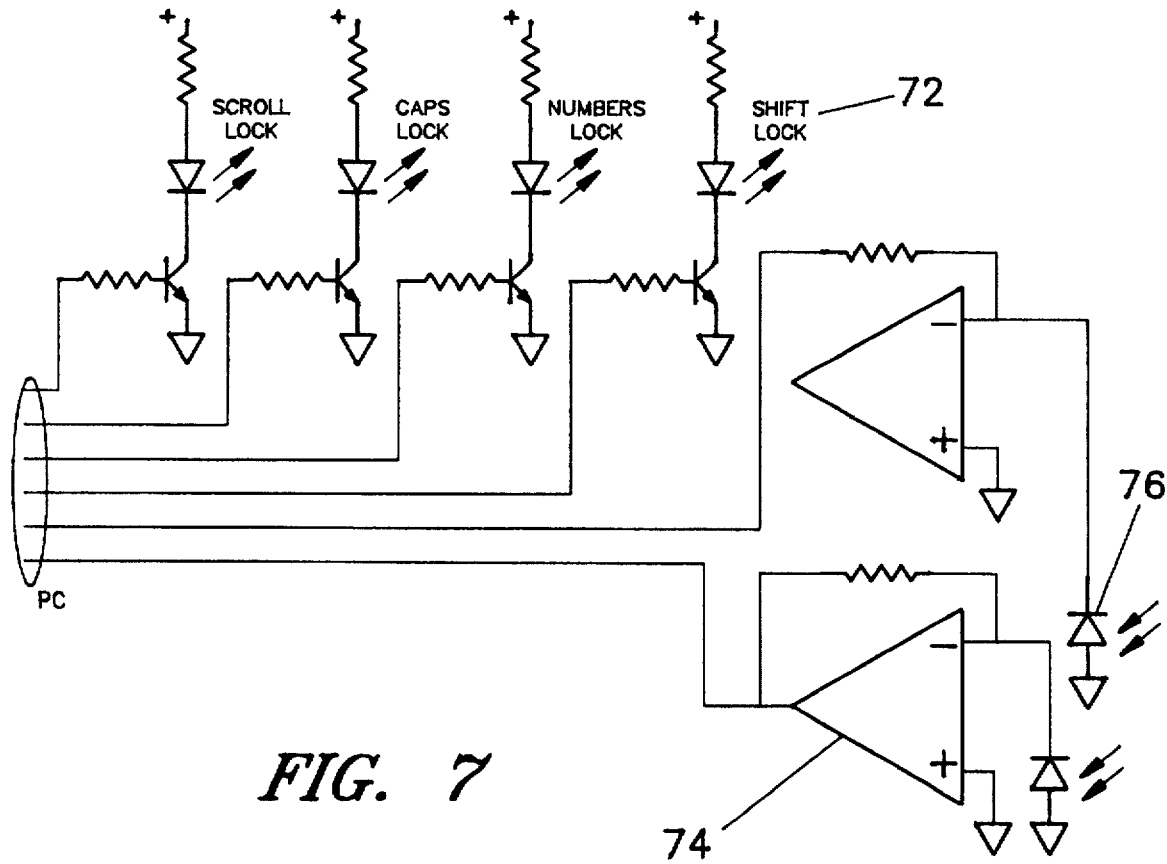
FIG. 7 is a schematic showing the indicia coding detectors and amplifiers, and output, LED's for standard keyboard functions in accordance with the teachings of this invention.

In FIG. 7 standard LED's indicators 72 are shown that display Shift Lock, Numbers Lock, Caps Lock and Scroll Lock.

Figure 8:
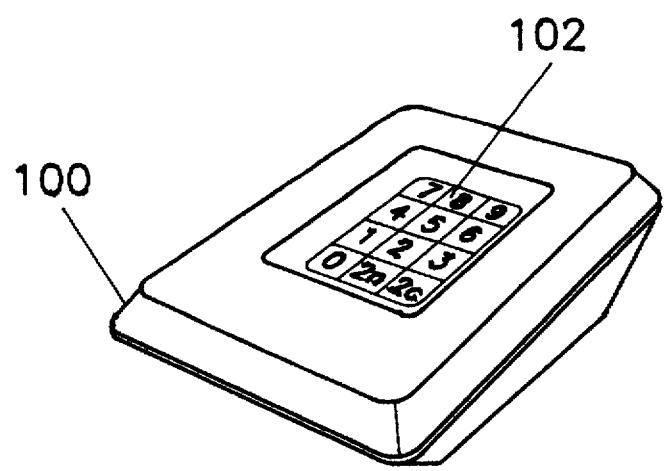
FIG. 8 shows a mouse with indicia on a flat planar surface in accordance with the teachings of this invention.

FIG. 8 shows a full function mouse with electronics housing 100 and unilocular area 102 so an operator can insert their finger and position a cursor. In the operation of the mouse shown in FIG. 8, the operator can be in the cursor positioning mode where the cursor is tracking the finger, and then by pointing to a predetermined point in the unilocular area switch the mode to a full function keypad where the finger is not tracked to move the cursor, but is scanned for discrete locations for key text entry. The combination of these two modes can be, the tracking of the finger in one area and the scanning for discrete locations in another area. Another operational mode of the mouse can be while the operator is in the cursor positioning mode, when the finger is removed from the unilocular area the removal generates a single click mouse function or data input signal, and if the finger is inserted back into the unilocular area, and not necessarily the same spot, within a predetermined time a double click mouse function or data signal is input. Still another operational mode of the mouse can be while the operator is in the cursor positioning mode, when the finger is removed from the unilocular area and then inserted back into the unilocular area, and not necessarily the same spot, within a predetermined time a single click or data signal is input, and if then removed and inserted back into the unilocular area within a second predetermined time a double click or data signal is input. The predetermined time is a software changeable timing that can be adjusted to an operators response. When the mouse is being used with a separate keyboard for the computer, the keys on the computer keyboard can be programmed for the different click and return combination with the mouse only being used for positioning the cursor. These operating modes allow for a full function mouse with no moving parts. These combinations and software option can be coded into the overlays being decoded by detectors 76 in FIG. 1.

FIG. 9 shows a full function mouse with electronics housing 120, switches 122, 124, 126 and 128, and the lower surface 130 of the unilocular area in which could be a display. The switches are not named because they could be used for any number of functions from turning on and off the mouse too inputting various click combinations, or ratio changes in relation to movement of the finger to actual cursor movement. In operation of the mouse in FIG. 9, the operator can position the cursor with their finger and then do a single click or a first data signal, or a double click or at second data signal type of input with one or more of the switches. Another switch can be used for a keyboard return function or for inputting a preprogrammed sequence of key combinations of multiple key strokes.

Figure 10:
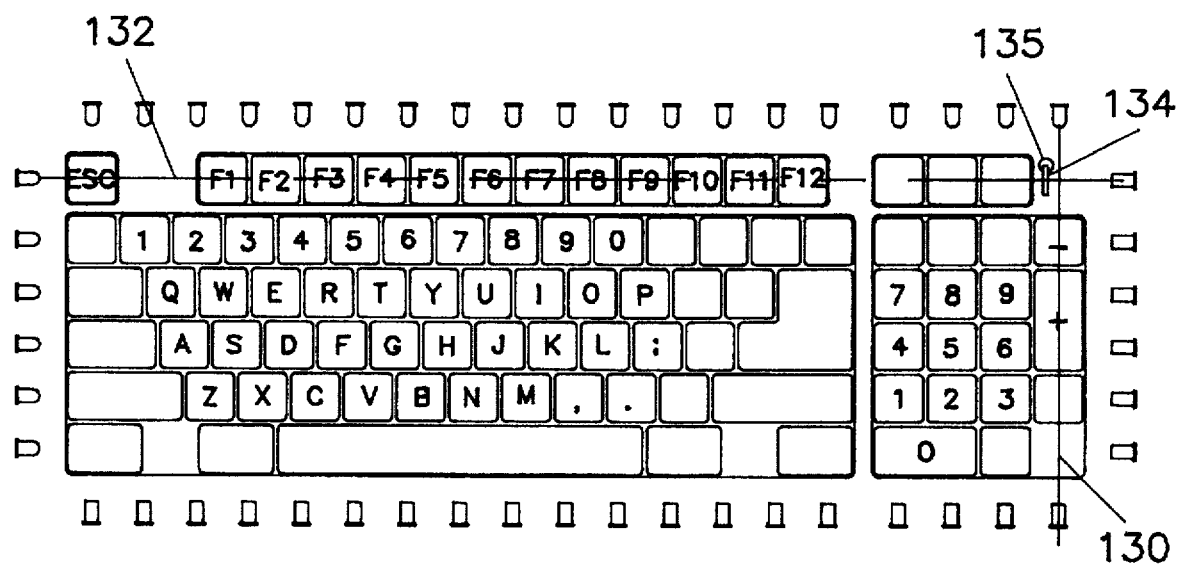
FIG. 10 shows a key in a vertical position in accordance with the teachings of this invention.
Figure 11:
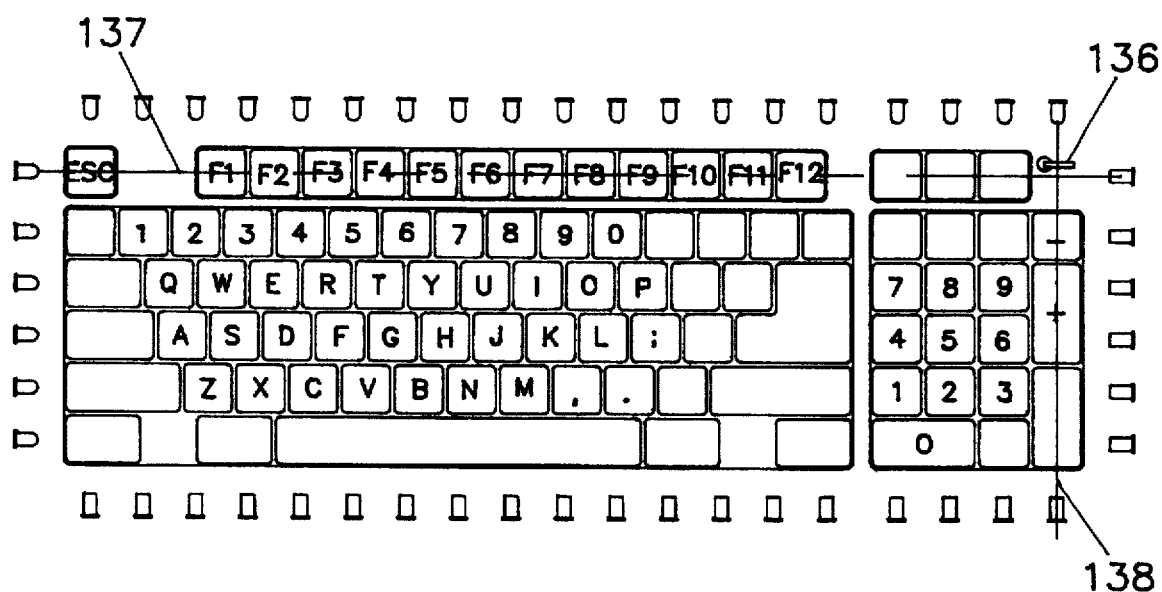
FIG. 11 shows a key in the horizontal position in accordance with the teachings of this invention.

FIG. 10 shows a security key 134 that is rotated about an axis 135 that is blocking the path of light beam 132 and not blocking the path of light beam 130, enabling the detection of security key 134 in a vertical position. In FIG. 11 key 136 is shown in a horizontal position blocking the path of light beam 138 and not blocking the path of light beam 137, enabling the detection of security key 136 in a horizontal position. This also allows for a third condition in which the absence of the key can be detected. It is obvious to those skilled in the art that other switch positions could also be detected and the location of the key could be anywhere within the unilocular area. With the security key being detected by the light beams alleviates the need for penetrating upper housing 10 in FIG. 1 to use a standard type of key and switch, thus stopping a means of egress for an electrostatic discharge from an operators finger. The key and pivot, and a detent mechanism can now be in a recess that does not penetrate upper housing 10.

Figure 12:
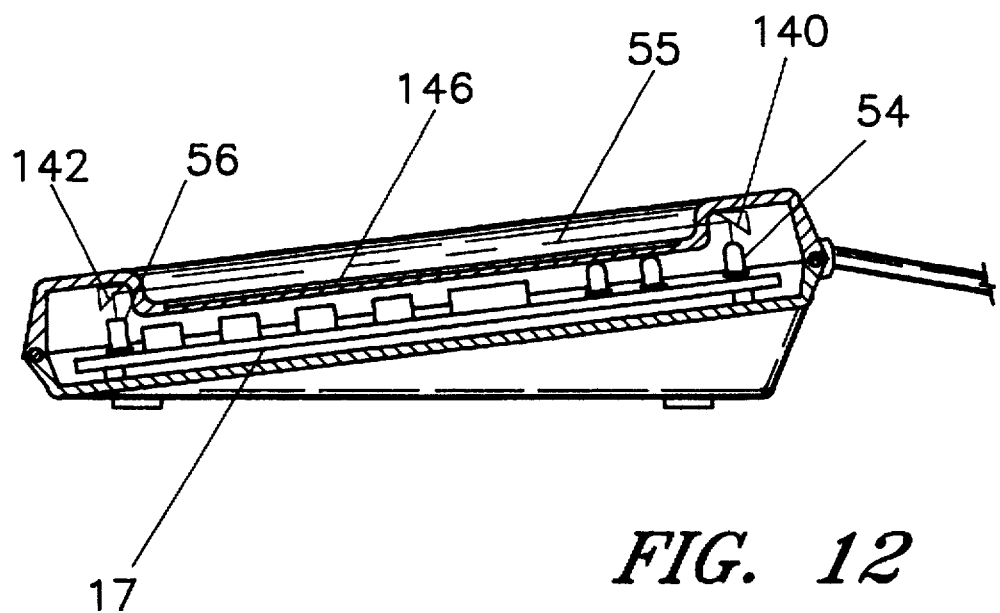
FIG. 12 shows a mirror surface for deflecting the emitted beam to the detector in accordance with the teachings of this invention.

In FIG. 12 emitter 54 and detector 56 are mounted perpendicular to PCB 17. The emitted light path 55 from emitter 54 reflects off of mirror surface 140 across over flat planar surface 146 and then reflects down from mirror surface 142 to detector 56. For ease of assembly and lower cost, the supports for mirror surfaces 140 and 142 could be molded into the housing, and also facilitating lower assembly cost for mounting emitter 54 and detector 56 directly on PCB 17. The depth of the unilocular area, in which flat planar surface 146 forms the bottom, can be varied, the shallower the unilocular area the easier it is to be wiped clean.

Figure 13:
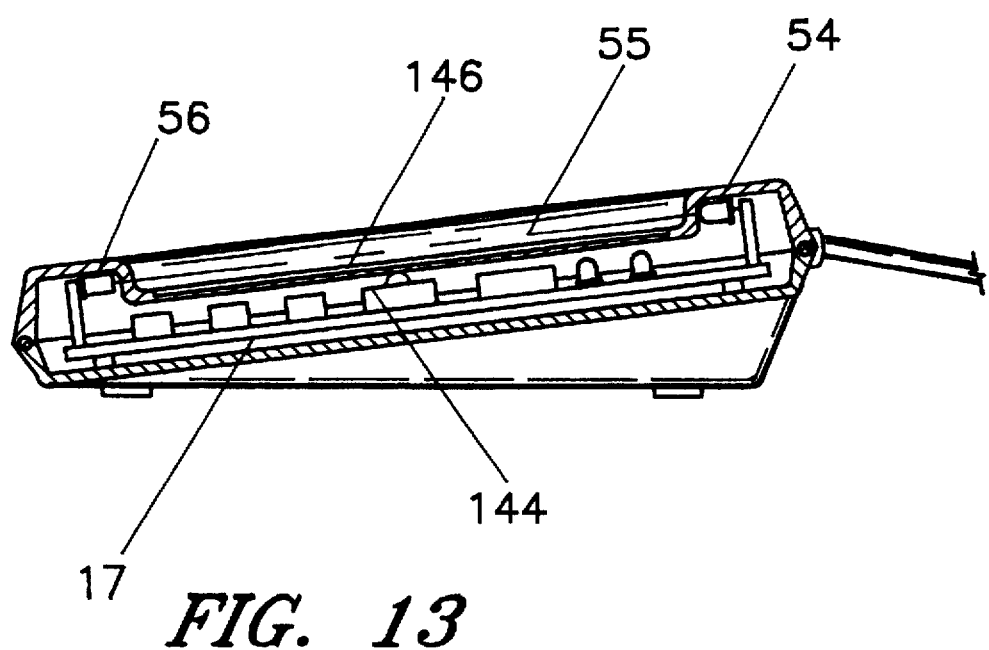
FIG. 13 shows a switch that when the indicia surface is deflected actuates in accordance with the teachings of this invention.

FIG. 13 shows a switch 144 mounted to PCB 17. Flat planar surface 146 when deflected can actuated switch 144 to input a single click of first data signal, or input a double click or second data signal. The configuration shown in FIG. 13 with one switch could be multiple switches to preform the same type function. Switch 144 could take various forms to accomplish the same function. One such switch type action could be a sandwich resistive element on the planar surface in the bottom of the unilocular area that is sensitive to the touch. Another could be a surface coated touch entry sandwich. Another could be energy wave in guided wave or surface wave types that are sensitive to the touch. Another could be a capacitive touch sandwich and still another could be a matrix of etched tracts in a sandwich all mounted in or near the bottom of the unilocular area. In operation the operators finger would be tracked for position, and when the cursor is in the desired position the finger would be depressed and a data entry would be made to the host computer.

Figure 14:
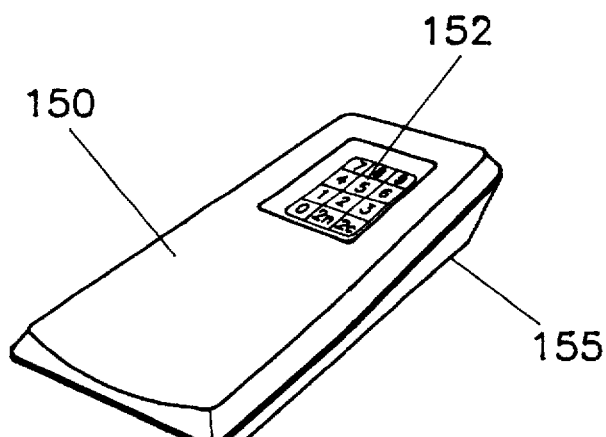
FIG. 14 shows a keyboard with an arm rest in accordance with the teachings of this invention.

FIG. 14 shows a full function mouse with an electronics housing 155 with the key area 152. Key area 152 can be a unilocular area when full travel key switches are not used. The arm rest 150 is in front of electronics housing 155. Arm rest 150 can be detachable or permanently part of electronics housing 155 to support the operators wrist, hand and forearm.

Figure 15:
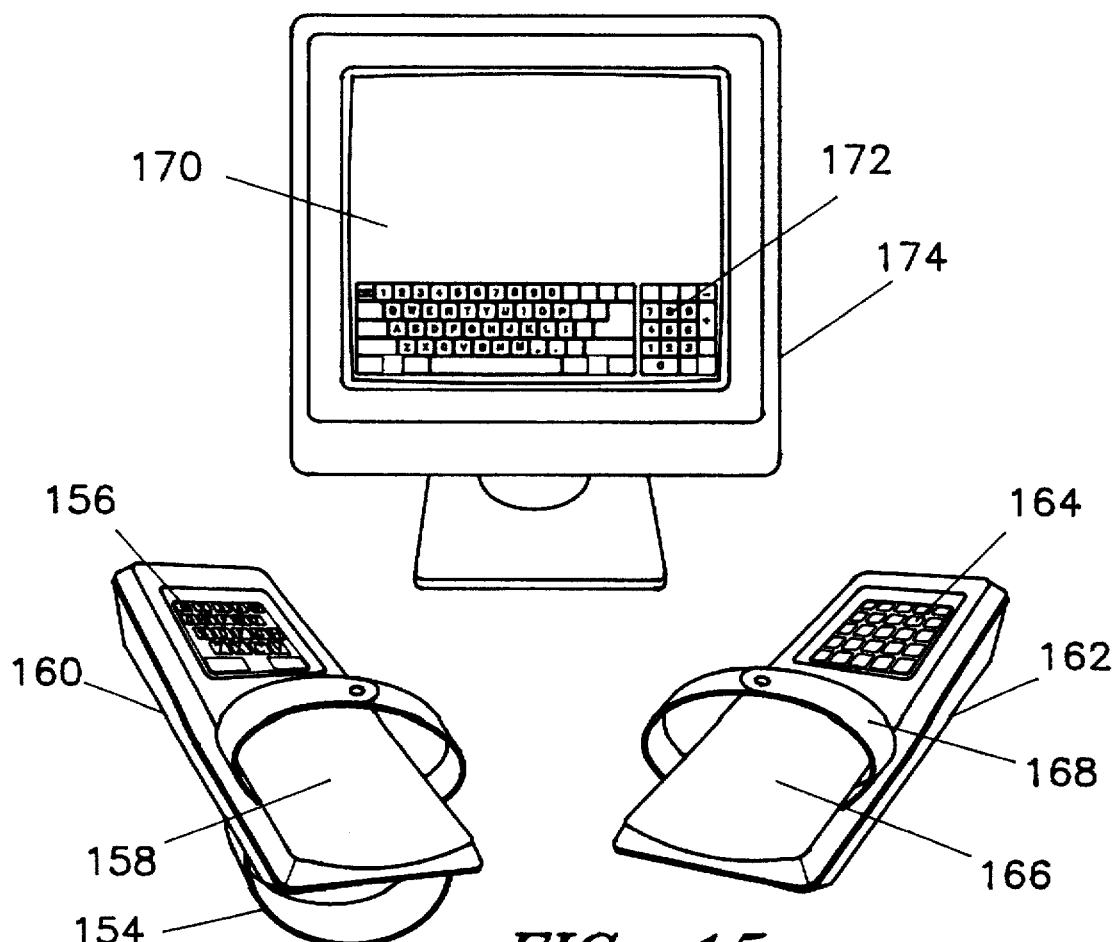
FIG. 15 shows a keyboard that the keys are split for data entry with each hand and each side has an arm rest with a strap to attach each side of the keyboard to a chair arm rest and/or to the operators arm in accordance with the teachings of this invention.

FIG. 15 shows a left keyboard 160 and a right keyboard 162. Both sides of the keyboard can either be electrically connected to each other and then one side connected to a host, both sides connected to a host or connected via FM to the host. A left key area 156 and a right key area 164 can be used for data entry with an operators arms resting in left arm rest 158 and right arm rest 166. Key areas 156 and 164 could be unilocular if full travel key switches are not used. With the support provided by the arm rests the operator fingers are all that is needed to move to enter data. The key indicia or key text in the left key area can be the left keys of a QWERTY keyboard and the right key text can be the right keys of a QWERTY keyboard. The key text could also be in any configuration or pattern to suit a particular application. Arm strap 168 could be one piece of elastic or be two pieces with velcro or a buckle to join. Arm strap 168 is for attaching the keyboard to an operators arm in applications where an operator is handicapped or when an operator wants to operate the keyboards in a position where a good operating surface is not well defined, i.e. couch cushion, leg or standing with no support. Rest strap 154 is for attaching the keyboard to a surface to operate the keyboard, i.e. chair arm rest or operators leg, where one end of the strap wraps around the arm rest or leg and attaches to the other end, or where both ends with a velcro type of connection attaches directly to the fabric.

Display 174 with a display area 170 display data entry from left keyboard 160 and right keyboard 162. Key pattern 172 can be shown in display area 170 in varying degrees of intensity of super imposing. In operation an operator that is not trained on different keyboard patterns on the data entry keyboard can watch the position of their fingers by high lighting the position on the display and then select a key shown by another level of high lighting, or the operator can just be shown what key that they have selected. Key areas 156 and 164 can have emitters and detectors surrounding the key text to detect and track an operators finger that is shown high lighted on display area 170, and then have a touch sensitive area at the bottom of key areas 156 and 164 to be used for the actual data entry. These touch sensitive areas can be any of the heretofore mentioned in this embodiment. The key text can be on actual standard QWERTY keyboards with moving key switches with the emitters and detectors surrounding the keys above the plane of the key text as shown in key area 156. This allows the operator to enter data from a keyboard that is unfamiliar without having to look at the keyboard.

Key areas 156 and 164 having emitters and detectors detecting and tracking an operators finger can input the position of the finger as the finger moves in key areas 156 or 164, and then the actual data entry is made when the finger is removed from the key area, in this application of this invention a touch sensitive area is not necessary.

To limit the actual movement of an operators fingers there can be one row of key text in key areas 156 and 164 to input data and one position in key areas 156 and 164 to change which row is being used. In operation one finger selects or scrolls through the rows of key text that could be from a QWERTY keyboard pattern and then the fingers select from that row which key text to enter. In this application of this invention the fingers do not have to reach over other rows of key text for data entry. The row is substantially perpendicular to the wrist and can be in an arc or be conformal to the natural location of where an operators fingers enter the key areas.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A data input panel with a non-penetrating security switch, comprising:

a housing having a unilocular area formed on one side, said unilocular area having a bottom surface and sidewalls surrounding a perimeter of said bottom surface which extend above said bottom surface, said unilocular area having a centrally located data input region and at least one border region adjacent a sidewall of said unilocular area;

a light emitter and a light detector positioned within said sidewalls of said unilocular area and defining a first light path which extends across said border region; and a security key connected or connectable to said housing, said security key being moveable between a first position in said first light path which blocks light transmitted from said light detector from being detected by said light detector, and a second position which is outside of said first light path, thereby allowing light transmitted from said light detector to be detected by said light detector.

2. The data input panel with a non-penetrating security switch of claim 1 wherein said security key is pivotally connected to said housing.

3. The data input panel with a non-penetrating security switch of claim 2 wherein said security switch is positioned within said unilocular area.

4. The data input panel with a non-penetrating security switch of claim 2 further comprising a plurality of paired data input light emitters and light detectors positioned within said sidewalls of said unilocular area, said plurality of paired data input light emitters and light detectors being configured to detect objects within said centrally located data input region of said unilocular area.

5. The data input panel with a non-penetrating security switch of claim 2 further comprising a second light emitter and a second light detector positioned within said sidewalls of said unilocular area and defining a second light path which extends across said border region, and wherein said security key blocks light transmission from said second light emitter to said second light detector when it is in said second position.

6. A data input panel, comprising:
   a planar surface forming a substantially flat bottom of a unilocular area;
   a light emitter and a light detector disposed at a border surrounding and above said planar surface and having a first light path therebetween; and
   a security key positioned inside said unilocular area, said security key being pivotable to at least a first position where said security key blocks said first light path, and at least a second position where said first light path is unimpeded by said security key.

7. The data input panel of claim 6 further comprising:
   a second light emitter and a second light detector having a second light path therebetween, said second light path being substantially perpendicular to said first light path, and wherein said security key blocks said second light path when it is in said second position.

8. The data input panel of claim 6 further comprising:
   an electronic circuit that illuminates said light emitter to emit light that is detected by said light detector; and
   means for sensing said security key when said security key blocks said first light path.

9. A data input panel, comprising:
   a light emitter and a light detector having a first light path therebetween, said light emitter and said light detector being disposed at a border of an area in said data input panel; and
   a security key positioned inside said area, said security key being pivotable to at least a first position where said security key blocks said first path and at least a second position where said first path is unimpeded by said security key.

10. The data input panel of claim 9 further comprising a second light emitter and a second light detector disposed at said border of said area and having a second light path therebetween, said second light path being substantially perpendicular to said first light path, and wherein said security key blocks said second light path when it is in said second position.

11. A data input panel, comprising:
    a light emitter and a light detector disposed at a border of an area in said data input panel having a first light path therebetween;
    a security key selectively positionable inside said area at a position which blocks said first light path; and
    a second light emitter and a second light detector disposed at said border of said area having a second light path therebetween, said second light path being substantially perpendicular to said first light path, and wherein said security key is selectively positionable at a second position in said area where said security key blocks said second light path.

* * * * *